United States Patent [19]

Snavely et al.

[11] Patent Number: 4,841,832
[45] Date of Patent: Jun. 27, 1989

[54] BOLTRUNNER

[75] Inventors: Gary L. Snavely, Farmington Hills; Richard Pelachyk, Utica, both of Mich.

[73] Assignee: General Motors Corporation, Detroit, Mich.

[21] Appl. No.: 84,887

[22] Filed: Aug. 13, 1987

[51] Int. Cl.⁴ .............................................. B25B 23/02
[52] U.S. Cl. .................................... 81/57.37; 81/431; 173/93
[58] Field of Search ................... 81/431, 57.37, 57.13, 81/57.24, 430, 433, 473, 475; 173/93

[56] References Cited

U.S. PATENT DOCUMENTS

| 2,256,012 | 9/1941 | Blair | 81/431 |
| 2,930,267 | 3/1960 | Apicelli | 81/431 |
| 3,214,941 | 11/1965 | Shulters | 173/93 |
| 3,323,394 | 6/1967 | Bangerter | 173/93 |
| 4,462,283 | 7/1984 | Ito | 81/57.37 |

Primary Examiner—James G. Smith
Attorney, Agent, or Firm—Ernest E. Helms

[57] ABSTRACT

The present invention provides an axial flow boltrunner eliminating the side feeding previously required in prior boltrunners. An embodiment of the present invention also provides a boltrunner which can be quickly changed to torque a plurality bolts of different sized heads without extensive modification.

4 Claims, 2 Drawing Sheets

BOLTRUNNER

FIELD OF THE INVENTION

The presetn invention relates to boltrunners. More particularly, the present invention relates to boltrunners useful in a factory assembly environment.

DISCLOSURE STATEMENT

The use of powered boltrunners, especially those on machine platforms is well known in the art. Most automatic boltrunners have a load or feed tube at an angle to a nose piece of the tool. A bolt is forced through the load tube by air pressure until the bolt enters the nose piece of the boltrunner. Once the bolt is positioned in the nose piece, a socket is advanced forward to contact with the head of the bolt. Once the head of the bolt is engaged by the socket, a motorized socket drive unit rotates the bolt and an actuator moves the bolt forward with the socket. Typically a retractable pincher type clamp holds the bolt as the bolt threadably engages the workpiece to be fastened. The clamp then releases the bolt and the bolt is continually torqued until a preset torque value is reached or until the tool stalls.

Shortcomings of the above-mentioned method and apparatus is that the tool transmit all the reaction torque to the machine platform or post which holds the boltrunner necessitating the use of a robot or platform large enough to resist the reaction torque of the boltrunner. Also, the bolts frequently jam at the intersection of the load tube and the nose piece of the tool. The tool cannot accommodate different sized bolt heads without human intervention to change the socket size of the drive unit. Furthermore, the tool is usually heavy and long and has a high moment of inertia.

SUMMARY OF THE INVENTION

To overcome the above noted and other shortcomings, the present invention is brought forth. The present invention provides a boltrunner wherein the bolts are axially fed to the nose of the boltrunner instead of the side feeding of prior boltrunners. Also, the present invention in its preferred embodiment utilizes a socket connection which allows the boltrunner to automatically change sockets without human intervention allowing the boltrunner to be used on a multitude of bolt head sizes.

It is an object of the present invention to provide an axial low boltrunner apparatus and method of utilization of the same. It is also another object of the present invention to provide a boltrunner which can be used on a plurality of different size bolts and can be changed without human intervention or extensive modification to accommodate bolts with different head sizes.

It is yet another object of the present invention to provide a boltrunner including a frame, power means mounted to the frame, means for feeding separated individual bolts to the frame, means to hold an individual bolt from the feeding means, and spindle means mounted to the frame and rotated by the power means whereby the spindle means is axially aligned with the feeder means and rotation of the spindle means causes a bolt held by the hold means to rotate and to be released from the hold means upon threaded engagement of the bolt.

It is yet another object of the present invention to provide a boltrunner for torquing bolts of various head diameters, including a frame, a pulsating air motor mounted to the frame, a feed tube for supplying separated bolts to the frame, a spindle axially aligned with the feed tube mounted to the frame and rotated by the air motor, and a quick connect socket connected with the spindle tube axially aligned with the spindle tube further including a spring for capturing the bolt by the head whereby rotation of the spindle tube causes the bolt captured by the spring to rotate and to be released from the socket upon threaded engagement.

It is yet another object of the present invention to provide a method of running bolts using a boltrunner, including feeding a separated bolt to a boltrunner frame along a first axis, holding an individual bolt fed to the frame, rotating a spindle rotatively mounted to the frame and axially aligned with the first axis whereby the bolt is rotated and released by the hold means upon threaded engagement of the bolt.

Other objects, desires and advantages of the present invention will become more apparent to those skilled in the art as the nature of the invention is better understood from the accompanying drawings and detailed description.

DETAILED DESCRIPTION OF THE DRAWINGS

Figure 1:
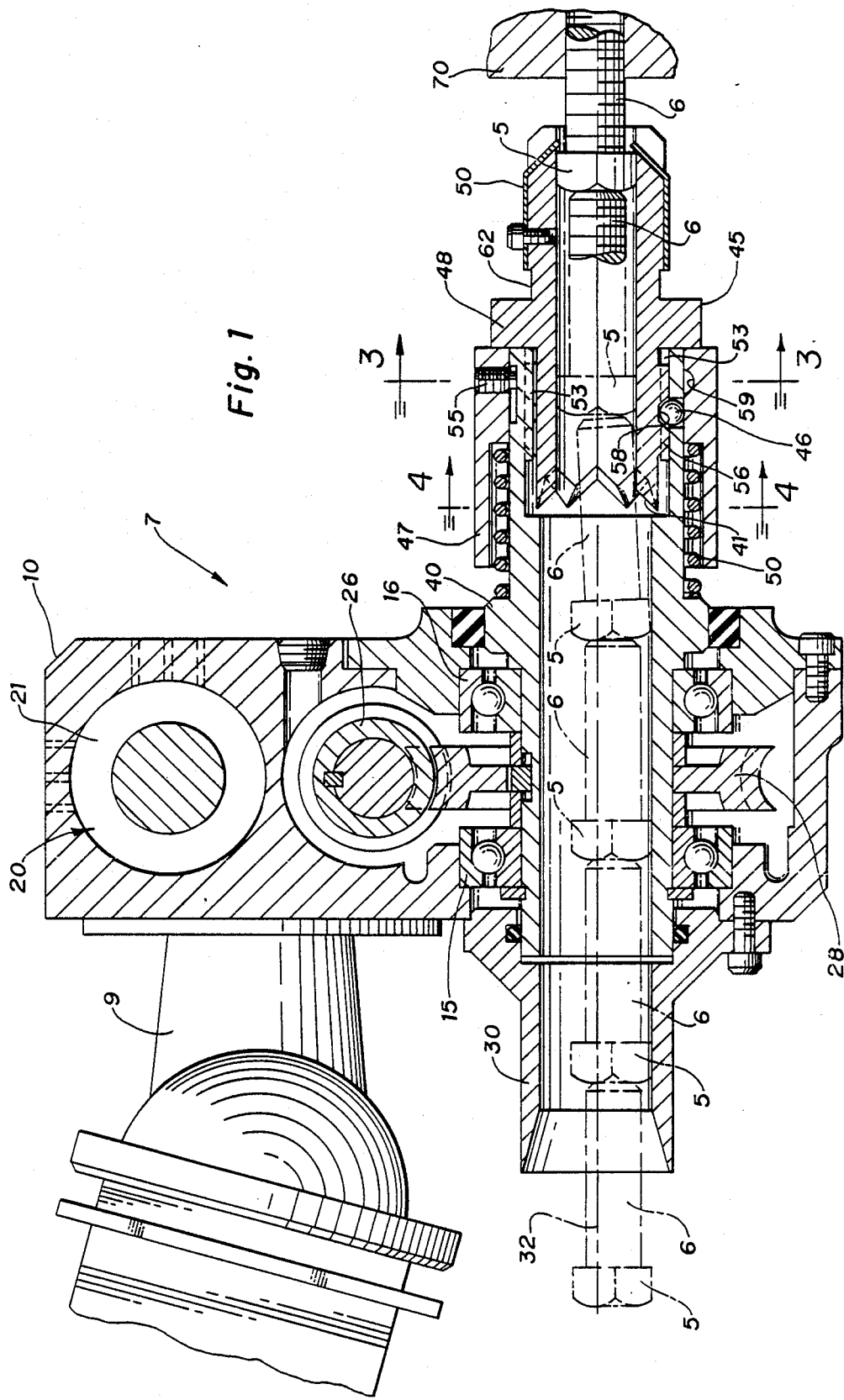
FIG. 1 is a view taken along line 1—1 of FIG. 2.
Figure 2:
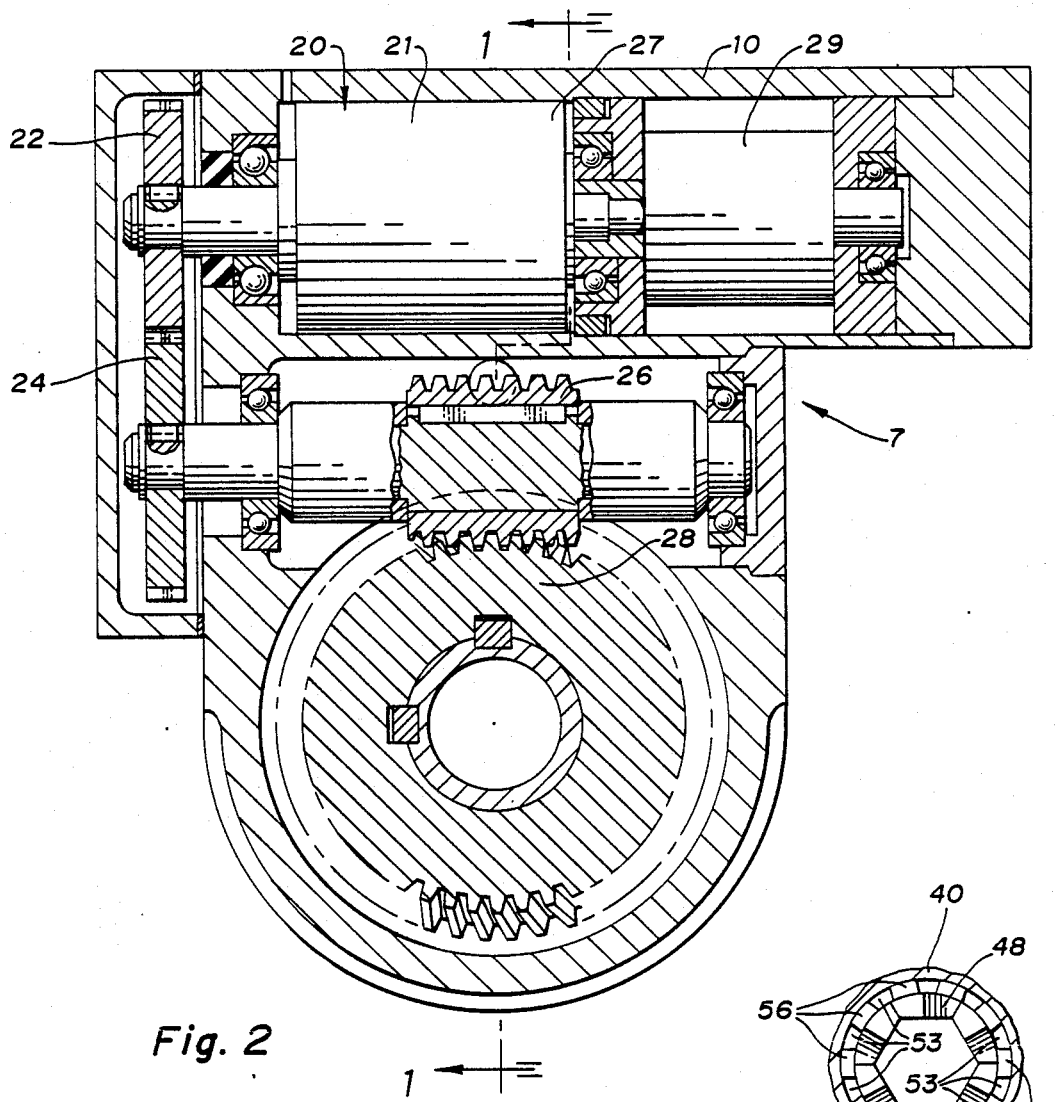
FIG. 2 is a sectional top view of a preferred embodiment of the present invention.

Referring to FIGS. 1, and 2 the boltrunner 7 of the present invention has five major elements. The first element is the frame 10. The frame 10 can be held or manipulated in a number of ways and is often held by a robot 9 or other support. Mounted to the frame 10 is the second major element, power means 20. In the embodiment illustrated, the power means 20 is an air motor 21 which is connected through gears 22 and 24 with a worm gear 26. Worm gear 26 meshes with pinion gear 28 which is in turn connected with a spindle 40 to be described later. The air motor 21 is a pulsating air motor similar to that of a Model U-610S of the AIM Corporation, Portland, Oregon. The air motor 21 has a conventional motor unit 29 coupled with a pulsating unit 27. At low torque values units 29 and 27 turn in unison, however at higher torque demands air motor 29 will rotate a predetermined number of revolutions, unit 27 will rotate once in a pulsating fashion in response to the rotations of unit 29. Therefore reactive force to robot 9 is minimized.

A feeder tube 30 supplies the third element of the present invention, the means to feed individually separated threaded fasteners such as bolts 6 to the frame 10. Feeder tube 30 has a first axis 32. Typically pressurized air will be used to move the bolts 6 through the feed tube 30. The fourth major element of the present invention is the spindle means 40 which is mounted to frame 10 by bearings 15 and 16. The spindle means 40 is axially aligned with the feed tube first axis 32 and is rotated by the power means 20. The spindle means also has a quick connect socket 48.

The last major element of the present invention is the means to hold an individual bolt from feed means which is provided by spring 50 which captures the bolt 6 by the bolt's head at the end of socket 48 opposite the spindle 40.

Figure 4:
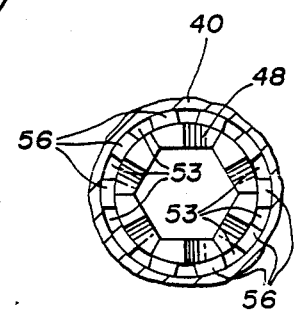
FIGS. 3 and 4 are views taken along lines 3—3 and 4-4, respectively, of FIG. 1.

In operation, a bolt 6 is blown through the feed tube 30. The bolt 6 continues to travel through the spindle 40 until it reaches a head orientation section 41 of the socket 48. Spindle 40 has a transverse dimension large enough to accommodate a plurality of bolt sizes. Orientation section 41 has a series of geometrically spaced radially aligned peaks and valleys. The peaks and valleys are also inclined at an angle with respect to first axis 32. The peaks intersect the hexagonal flats of the interior cross section of the socket 48 as shown in FIG. 4. Feed tube 30 and spindle 40 have a circular cross sectional interior dimension. On most occasions the bolt head 5 will make contact with the orientation section 41 and then is urged into a position of alignment with the hexagonal cross section (FIG. 4) of the socket 48. The bolt then continues its travel through socket 48 and is then stopped by the spring clips 50 at the nose end of the socket 48. The robot 9 positions of frame 10 in position over the workpiece 70 to be fastened.

The air motor 21 causes the spindle 40 to rotate. Air pressure behind the bolt 6 keeps an axial force on the bolt 6 as the bolt threads are engaging with the threads in workpiece 70. Once the bolt threads become engaged, rotation of the bolt 6 causes the head 5 of the bolt 6 to release past the spring 50. Rotation of the bolt 6 continues until a preset torque level of the boltrunner 7 has been achieved.

Figure 3:
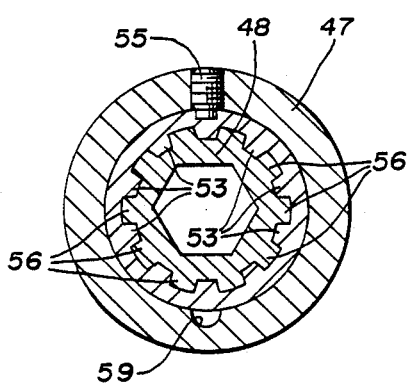
Figure 5:
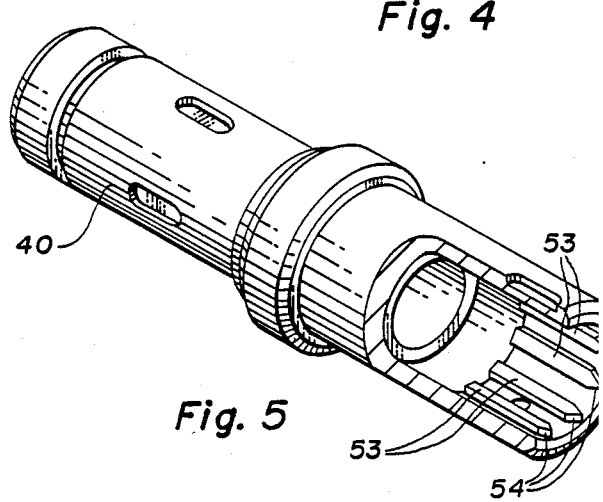
FIG. 5 is a sectional view with portions in perspective of the spindle illustrated in FIG. 1.

Referring additionally to FIGS. 3 and 4, a portion of the interior dimension of socket 48 is sized and matched for bolt heads 5 of a given selected shape and diameter. The socket 48 has a series of alignment teeth 56 which are fitted between a series of spindle teeth 53.

Spindle 40 has a spring loaded collar 47 which traps ball 46 within an aperture of the spindle. Collar 47 is retained on spindle 40 by retaining screw 55. Retaining ball 46 is also captured in groove 58 of the socket 48. Collar 47 rest on a shoulder 45 of the socket 48.

To change socket 48 robot 9 places socket 48 in a fixture (not shown). The fixture has a top plate with a hole of a diameter greater than the diameter of the spindle 40 (as shown along line 4—4 of FIG. 1) but less than the diameter of collar 47. The fixture also has a bottom plate with a key hole to capture the socket 48 by groove 62. The bottom plate is verticallly moved by an air cylinder. To release the socket 48, the robot 9 will position the socket into the fixture and collar 47 is held up by the fixture top plate to position collar groove 59 adjacent to retaining ball 46. The robot then moves the socket in the fixture slightly sideways to complete the grasp of the fixture bottom plate to groove 62 of the socket. The air cylinder is actuated downwards and socket 48 is removed from spindle 40.

Robot 9 will then pull frame 10 and spindle 40 away to position them over the newly desired socket. The new socket will have like outside dimensions to socket 48 and is retained in a similar fixture. Spindle 40 and/or the new socket are allowed to rotate. The robot will place spindle 40 over the new socket. Edges 54 will align the socket teeth 56 to the space between spindle teeth 53 upon downward movement of frame 10 and spindle 40 (by virtue of downward movement of robot 9). Collar 47 is held up by the fixture top plate to position groove 59 adjacent to retaining ball 46. The fixture bottom plate, which grasps the new socket 48 by the groove 62 will move upwards to position the socket groove 58 adjacent the retaining ball 46. Robot 9 then moves spindle 40 over slightly to release socket 48 from the fixture bottom plate. As robot 9 pulls upward, collar 47 moves downward (with respect to spindle 40) to position collar groove 59 away from retaining ball 46 to lock the socket in place. The boltrunner 7 is now ready for the new bolts.

The present invention provides a method of running bolts 6 using a boltrunner 7, the method including the following steps:

1. Feeding 30 a separated bolt 6 to a boltrunner frame 10 along a first axis 32;
2. Holding 50 an individual bolt 6 fed to the frame 10;
3. Rotating 20 a spindle 40 rotatively mounted to the frame and axially aligned with the first axis 32 whereby the bolt 6 is rotated and released by the hold means 50 upon threaded engagement of the bolt 6.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defned as follows:

1. An axial feed boltrunner for torquing threaded fasteners of a plurality of selected sizes, said boltrunner in combination comprising:
    a frame;
    power means mounted to said frame;
    means for feeding separated individual threaded fasteners to said frame;
    spindle means accepting threaded fasteners from said feeding means including a spindle tube mounted to said frame and rotated by said power means, said spindle tube transverse dimension being large enough to accommodate a plurality of sizes of said threaded fasteners; and
    a quick connect socket aligned with said spindle means having a portion with a transverse dimension for torsional contact with a selected sized threaded fastener said socket also having an orientation section for aligning said threaded fasteners with said torsional contact portion, said socket having on an end opposite of said spindle means to hold an individual threaded fastener whereby rotation by said spindle means causes a bolt held by said hold means to rotate and release from said hold means upon threaded engagement of said threaded fastener.

2. A boltrunner as described in claim 2 wherein said power means includes a pulsating fluidic motor.

3. An axial feed boltrunner for torquing bolts of various head diameters, said boltrunner in combination comprising:
    a frame;
    a pulsating air motor mounted to said frame;
    a feed tube for supplying separated bolts to said frame;
    a spindle tube axially aligned with said feed tube mounted to said frame and rotated by said air motor said spindle tube transverse dimension being large enough to accommodate a plurality of head sizes of said bolts; and
    a quick connect socket axially aligned with said spindle tube with a portion of said socket having a transverse dimension matched for torsional contact with said selected size bolt head, said socket also having an orientation section for aligning said bolts with said torsional contact portion, said socket being connected with said spindle tube axially aligned with said spindle tube further including a spring for capturing said bolt by said head whereby rotation of said spindle tube causes said bolt captured by said spring to rotate and to be released from said socket upon threaded engagement.

4. A method of running bolts using a boltrunner, said method in combination comprising:

feeding a separated bolt to a boltrunner frame along a first axis;

accepting said fed bolt in a spindle rotatively mounted to said frame and axially aligned with said first axis, said spindle having a transverse dimension large enough for accommodating said bolt;

joining to said spindle a socket axially aligned with said spindle having a portion for torsionally contacting said bolt;

orientating said bolt from spindle to said torsionally contacting portion of said socket;

holding said individual bolt fed to said rotating said spindle and torsionally contacting said bolt with said socket whereby said bolt is rotated and released by said socket upon threaded engagement of said bolt.

* * * * *